United States Patent Office 3,798,299
Patented Mar. 19, 1974

3,798,299
PROCESS FOR THE MANUFACTURE OF A STRUCTURE OF POSITIVELY CONNECTED CORRUGATED AND FLAT SHEETS OF THERMOPLASTIC MATERIAL
Peter Gumm, Frankfurt am Main, Karl-Heinz Krubig, Hattersheim, Jorg Lohmann, Dortmund, and Josef Zimmermann, Niederhofheim, Taunus, Germany, assignors to Farbwerke Hoechst Aktiengesellschaft vormals Meister Lucius & Bruning, Frankfurt am Main, Germany
Filed Apr. 19, 1972, Ser. No. 245,347
Claims priority, application Germany, Apr. 21, 1971,
P 21 19 321.5
Int. Cl. B29c 17/02
U.S. Cl. 264—249                                    5 Claims

ABSTRACT OF THE DISCLOSURE

A process for manufacturing a structure is described which consists of a corrugated and a flat sheet or film of thermoplastic material, which sheets are positively connected by matching depressions with undercuts arranged along the grooves of the corrugated sheet and at corresponding points of the flat sheets. The structure is especially suited to make inserts for trickling-filter towers.

Matching depressions are produced simultaneously in the flat and the corrugated sheet in their areas of contact, and the depressions are then compressed whereby an undercut positive connection is formed.

The device may be operated continuously or intermittently, its main part consisting of the tool for making the positive connections. Said tool comprises as the essential parts a series of female molds designed to fit in the grooves of the corrugated sheet, and a counteracting plug. In the female mold a spring-loaded punch is guided. To form the positive connections the plug advances into the female mold against the spring-loaded punch, and thereby depressions are formed in the corrugated and the flat sheet which are guided one upon the other through the tool. As the plug retracts, the spring-loaded punch advances to compress the depressions whereby the undercut is formed and the sheets are firmly connected.

---

The present invention relates to a process for making structures of positively connected corrugated and flat sheets or films of thermoplastic materials.

Owing to the connection between the corrugated sheet and the flat sheet at several points of their areas of contact, a composite structure having a high momentum of inertia and, hence, a high stiffness in flexure, is obtained.

Structures of corrugated and flat films have been proposed in which the profiles have different shapes, for example triangular, trapezoid, sinusoidal, or sheetpiling shape, and which are widely used, for example in heat exchangers and scrubbing towers. To produce the known structures the films are connected by glueing, welding or riveting.

Glueing of the films or sheets is disadvantageous in that the application of the adhesive is complicated, the setting time only permits low production rates, and the apparatus required is very expensive. Moreover, in many cases the bonding points are not resistant to solvents.

The production of structures of the aforesaid type from thermoplastic films or sheets by heating tool welding has the drawback that the production rate is essentially limited by the required heating and cooling period. High frequency welding can only be performed with thermoplasts of high dielectric loss factor and the required apparatus is expensive.

Rivet joints require not only additional joining elements—the rivets—but also a precise perforation of the parts to be joined and a complicated insertion of the individual rivets which is very time consuming. A reliable tightness of the riveted joints is only ensured as far as after riveting flow phenomena in the area of the rivet joints do not detrimentally affect the strength and tightness.

Owing to the aforesaid drawbacks, the known processes can only be used for making structures of relatively small size.

The indicated drawbacks can be overcome in that structures of the aforesaid type are produced from thermoplastic film or sheet material and the points of contact have such a shape that they fit exactly into each other.

The present invention provides a process for making a structure composed of a corrugated and a flat sheet or film of a thermoplastic material wherein the corrugated sheet and the flat sheet are firmly and positively connected with one another by matching depressions with undercuts arranged along the grooves of the corrugated sheet and at corresponding points of the flat sheet.

The number of the individual positive connections per unit of area can be chosen according to the demand on the stiffness of the finished structure.

For making the structures according to the invention thermoplastic materials having a high strength combined with good shaping properties are especially suitable, for example polyvinyl chloride, polyethylene, polypropylene, polystyrene, chlorinated polyolefins, as well as mixtures thereof, polycarbonates, polymethacrylates, and the like.

The novel structures do not require additional joining elements or agents. The positive connections between the sheets are solid and tight. Experiments carried through with a structure of polyvinyl chloride sheets having a thickness of 250 microns joined by means of circular depressions having a diameter of 6 mm. showed a shearing strength of 8 to 10 kilograms for each joint.

By arranging the individual joints at distances, structures of different stiffness can be produced, depending on the intended application, and for each purpose of application an especially economic design can be chosen. The depressions and undercuts may have any desired shape. It proved advantageous, however, to use depressions with undercuts having a circle as cross section, as in this case the stress conditions in films are favorable when the joints are produced. Moreover, joints of the aforesaid type offer advantages with respect to the device for making the structures.

The present invention also provides a process for the manufacture of structures of a corrugated sheet and a flat sheet of a thermoplastic material which comprises producing matching depressions in the flat sheet and in the corrugated sheet in their areas of contact by deep drawing and subsequently producing positive connections by compressing so as to obtain undercuts.

By the common deep drawing of the sheets at the areas of contact it is ensured that the depressions exactly match one another and that in the compression step, executed directly after deep drawing, undercuts are produced with a reduction in the original cross section of the depression. Exactly matching depressions and an exact formation of the undercuts are necessary to obtain a fast positive connection having a high strength. To improve the shaping properties of the thermoplastic sheets, they may be heated at the temperature commonly used in forming. The process permits high and economic production rates. In a pilot plant, a rate of 10 meters per minute was reached. This speed can be considerably increased in a production plant.

The invention will now be described by way of example with reference to the accompanying drawings in which FIG. 1 is a erspective view of a structure according to the invention;

Figure 1:
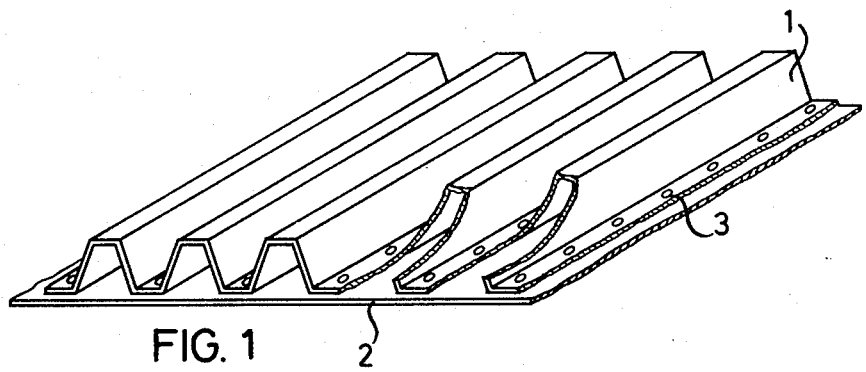
Figures 2A, 2B, 2C:
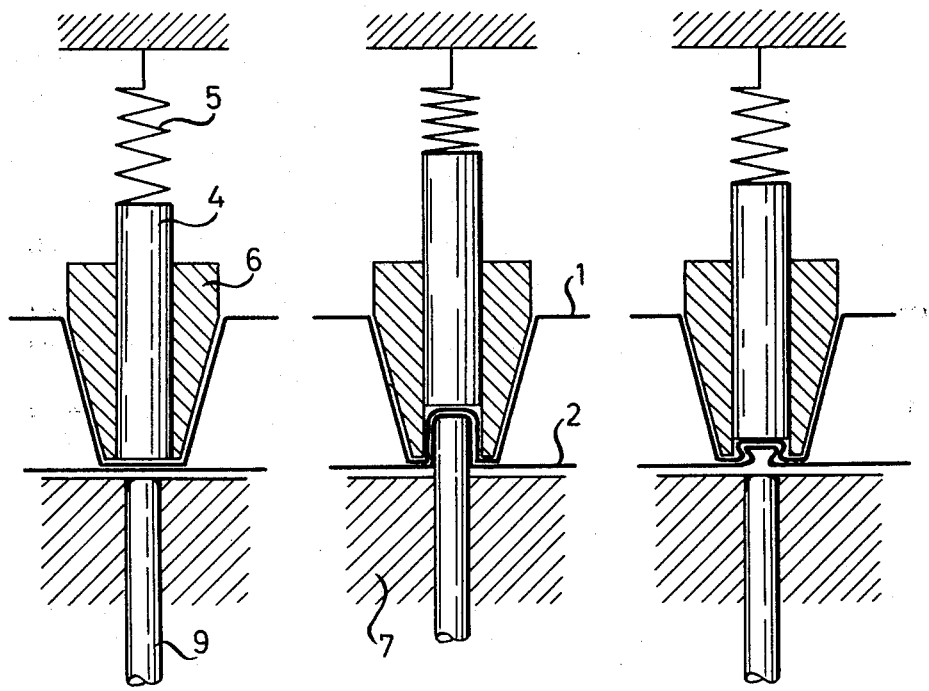
FIG. 2 is a detail sketch of the essential elements of the deep drawing and compressing means and shows the individual steps to make a joint.

The structure shown in FIG. 1 consists of a corrugated sheet or film 1 having the shape of a sheet piling which is connected with a flat sheet or film 2 by positive connections 3.

The device used for making the joints comprises a female mold and a male mold. The female mold is provided with a cavity in which slides a mating punch 4 connected with pressure spring 5. The male mold is provided with plugs 9 for deep drawing the sheets. The joints in the sheets are produced as follows: The sheets are held in their position by the female mold and the male mold, plug 9 produces a depression or protrusion in the sheets and simultaneously presses opposite punch 4 against pressure spring 5. When plug 9 is withdrawn, the opposite punch 4 follows and the protrusion is compressed in such a manner that an undercut is formed. The counter-movement of punch 4 can also be brought about, of course, by pneumatic or hydraulic means.

Figure 3:
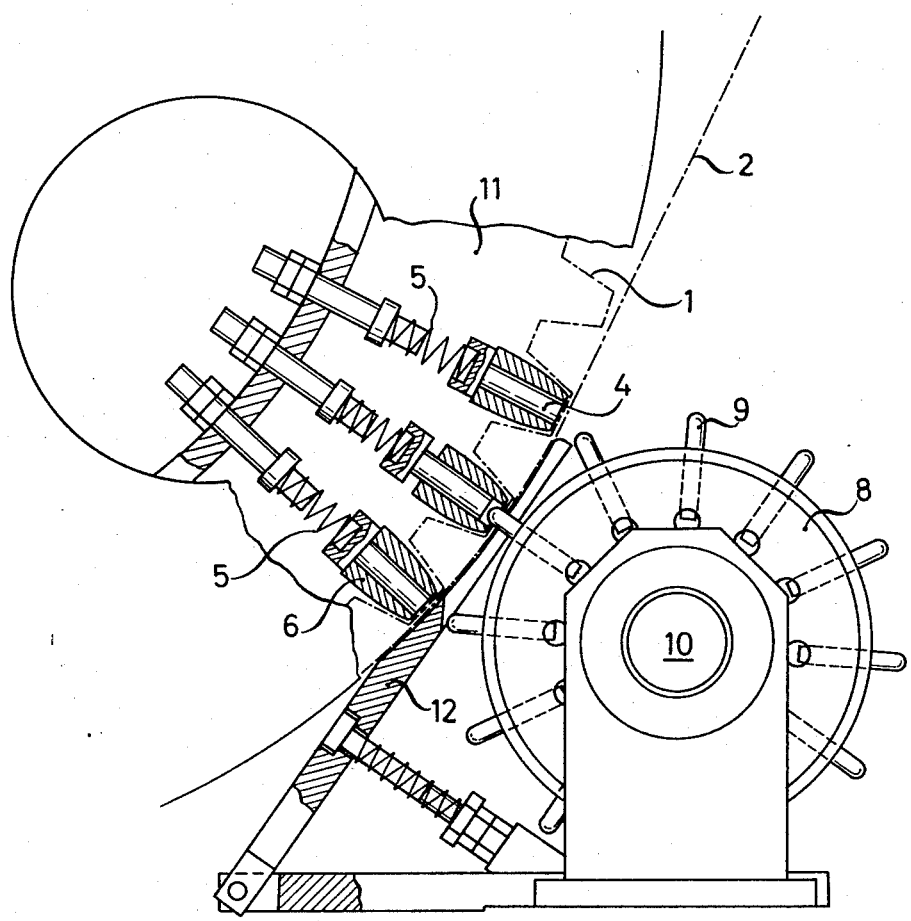
FIG. 3 shows a continuously operating device for making the positive connections between the corrugated and the flat sheets.
Figure 4:
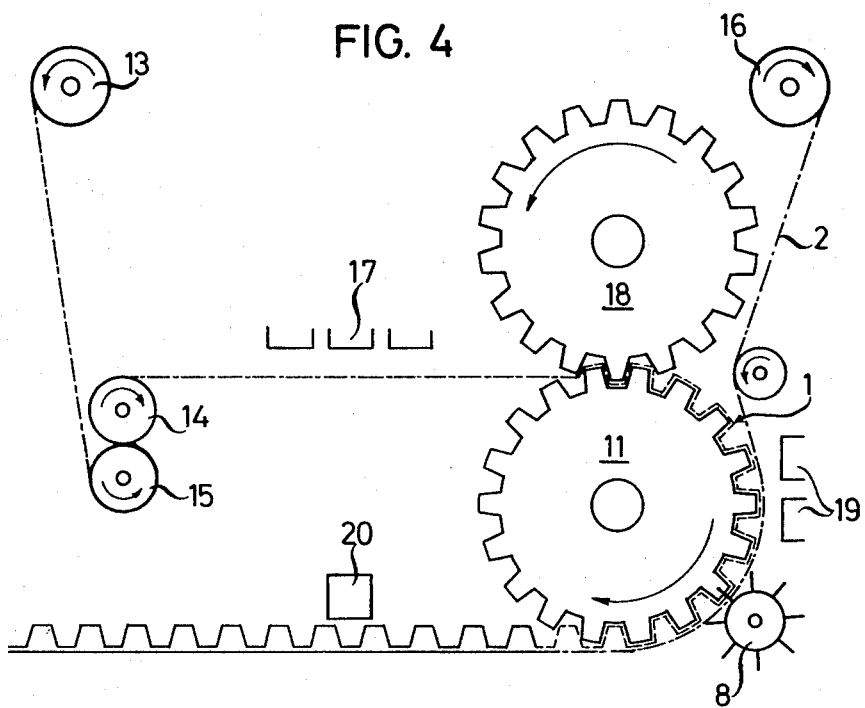
FIG. 4 illustrates a device suitable for making the corrugated sheet and simultaneously producing a structure according to the invention.
Figure 5:
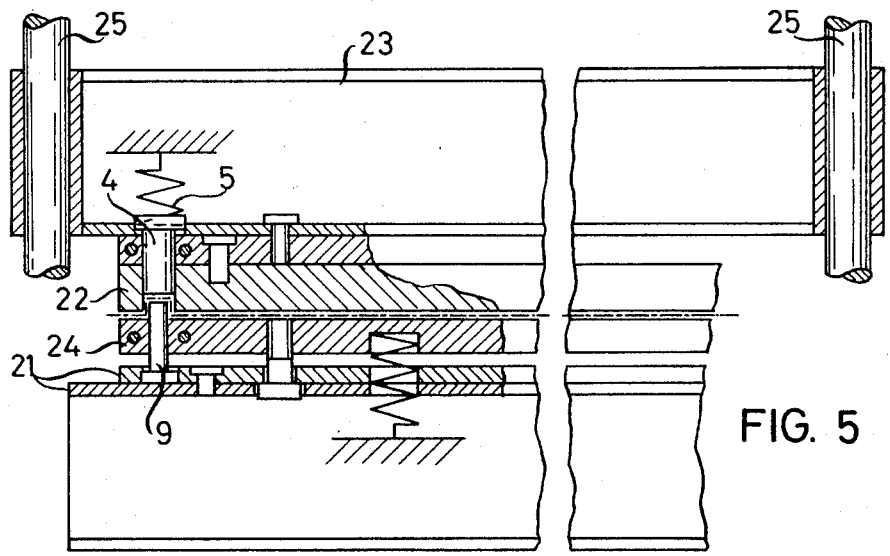
FIG. 5 is a longitudinal view of a device operating with continuously repeating strokes.
Figure 6:
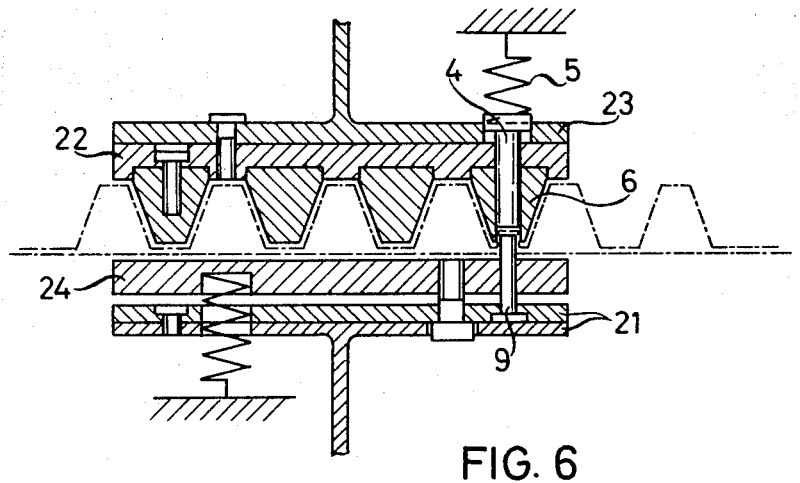
FIG. 6 is a cross sectional view of a device operating with continuously repeating strokes.

With a continuously operating device, the corrugated sheet 1 and the flat sheet 2 are passed through a hobbing tool, as shown, for example, in FIG. 3. The hobbing tool consists of a hub 8 with radially inserted plugs 9. Hub 8 is mounted on a shaft 10. In the engagement zone plug 9 engages in the cavity of the female mold 6 in which mating punch 4 is guided, and disengages again. The female molds 6 are arranged on roll 11. The corrugated sheet 1 and the flat sheet 2 are concomitantly introduced into the engagement zone of the tool. In the case of a hobbing tool the hold down plate 12, which is elastically mounted, is provided with a slit and presses the sheets against the female mold 6. Plug forms a cup-like depression or protrusion which is pressed against hold down plate 12 by spring-actuated punch 4 when plug 9 disengages, whereby a fast joint is formed by undercuts.

The expenditure pertaining to apparatus in the manufacture of the structures according to the invention can be considerably reduced by combining the device for profiling the corrugated sheet 1 with the tool for making the positive connections. In this case, the female mold used for making the connections simultaneously produces the corrugations in sheet 1. For this purpose, the sheet or film is guided from roller 13 to feed rolls 14 and 15 which confer upon the sheet or film the necessary feeding speed by a connected drive (not shown). The sheet or film then passes a heatng zone in which adjustable radiators 17 heat the sheet or film at a constant temperature and is taken up by intermeshing profiled roll 18 and roll 11 carrying the female molds so that the corrugated sheet 1 is formed. At the outlet side of profiled roll 18 and female mold roll 11 the flat sheet 2 is wound off roller 16 and passes a heating zone 19 toether with the corrugated sheet 1. The positive connections are produced as described above while the hold down plate presses the sheets against the female molds of roll 11. After the production of the positive connections the edges of the issuing structure may be provided with a seam by separating disks 20.

The structures of corrugated sheet and flat sheet can also be produced with a device operating with repeating strokes. A device of this type comprises a plate 21 carrying plugs 9 as male mold and a plate 22 with female molds 6 which plate is fixed on a movable cross beam 23. The female molds 6 are provided with punches 4 connected with springs 5. Between the female molds 6 and plate 21 carrying the plugs a hold down plate 24 is elastically mounted on the said plate 21. By means of the cross-beam 23 lifting movements are preferred. Cross beam 23 is centered by guides 25.

The devices described above permit the manufacture of very long structures without seam. The width of the structures is only limited by the width of the available sheets or films. Moreover, the devices allow of using different plastics materials for the corrugated and the flat sheet or sheets of different thicknesses This may be of advantage with regard to the intended use of the final structure. For example, the action of different chemical substances on both sides of the finished structure may necessitate the use of different plastics materials. By selecting different materials and thicknesses for the structures, optimum conditions can be obtained for the possible mechanical stresses, for example either substantial bending stress or compressive stress.

Structures of a corrugated and a flat sheet of thermoplastic material are well suitable for the manufacture of percolating filters in biological purification processes of sewage disposal. When waste water trickles over the filter, it streams along the surface and with a good aeration a biological culture substantially consisting of bacteria forms on the surface. The metabolic products formed in the degradation of the waste water impurities are washed off by the liquid.

Hitherto, mostly filling of lava or other aggregates were used for the trickling filters in biological purification plants for sewage disposal.

The trickling filters made of plastics material have considerable advantages. With an appropriate profile large surfaces can be obtained per unit of space of the filter. The advantages of the highly efficient trickling filters made from the structures according to the invention are the following:

The straight ducts ensure a good aeration even with very high trickling filters. In contradistinction to fillings with scorifield lava clogging of the filter by flushing out of the detached biological culture is avoided. To make trickling filters a structure according to the invention may simply be rolled up. As compared with the known trickling filters of vacuum formed plastics elements, the rolled filter of a structure of the invention does not require special clamping and holding means. Moreover, several rolled up structures may be arranged one one top of the other without intermediate grates. The extremely simple production of the rolled structures and the low costs for mounting them constitute considerable economic advantages in the construction of tower type trickling filters for the purification of sewage disposal. Owing to their high modulus of elasticity rigid polyvinyl chloride sheets appear to be especially economic for the manufacture of the trickling filters.

Still further, the structures according to the invention can also be used in building industry as covering panels, steam obstacles and insulating layers. Temperature compensating roofings, for example, must be provided with steam obstacles and vapor pressure compensating layers. A structure according to the invention performs both functions if the flat sheet is broader than the corrugated sheet. The projecting flat edges can be bonded in such a manner that the entire roof area is covered with a system of ducts, independent of the laying direction, which is in communication with the outside air.

What is claimed is:

1. A process for the manufacture of a structure consisting of a corrugated and a flat sheet or film of a thermoplastic material which comprises simultaneously producing matching depressions in the corrugated and in the flat sheet or film in their areas of contact by deep drawing and subsequently producing positive connections by compressing the depressions so as to obtain undercuts.

2. A process for the manufacture of a structure consisting of operably interconnected corrugated and flat sheets of a thermoplastic film, said process comprising the steps of positioning said corrugated and flat sheets in superimposed relation to each other, with portions of said corrugated sheet in contact with said flat sheet, simultaneously forming mating projections in said sheets in the areas of contact therebetween, and thereafter compressing said projections against said sheets to form undercuts therein, thereby interconnecting said sheets.

3. The process as defined in claim 2 including the step of heating said sheets just prior to said forming and compressing steps.

4. The process as defined in claim 2 wherein said forming step comprises the step of passing said superimposed sheets of thermoplastic material between male and female mold members.

5. The process as defined in claim 4 wherein each of said female mold members has a movable mating punch therein and said compressing step comprises moving said punch against its associated projection.

References Cited
UNITED STATES PATENTS

| | | | |
|---|---|---|---|
| 3,381,068 | 4/1968 | Leiper | 264—318 X |
| 2,800,321 | 7/1957 | Jarret | 264—318 X |

DONALD J. ARNOLD, Primary Examiner

R. R. KUCIA, Assistant Examiner

U.S. Cl. X.R.

264—255, 287, 318